United States Patent [19]
Hirao et al.

[11] Patent Number: 5,892,738
[45] Date of Patent: Apr. 6, 1999

[54] DISK RECORDING-PLAYBACK DEVICE AND DISK LOADING OR UNLOADING METHOD

[75] Inventors: Keiji Hirao, Moriguchi; Tadahiro Mitani, Matsubara; Hitoshi Ogata, Sakai; Masanao Yoshida, Osaka, all of Japan

[73] Assignee: Sanyo Electric Co., Ltd., Osaka, Japan

[21] Appl. No.: 880,441

[22] Filed: Jun. 23, 1997

[30] Foreign Application Priority Data

Jun. 25, 1996 [JP] Japan .................................. 8-163987
Jun. 28, 1996 [JP] Japan .................................. 8-168803

[51] Int. Cl.$^6$ .................................................. G11B 17/22
[52] U.S. Cl. ................................ 369/37; 369/30; 369/36
[58] Field of Search ................................. 369/30, 34, 33, 369/35, 36, 37, 38, 178, 179, 191; 360/92

[56] References Cited

U.S. PATENT DOCUMENTS

| | | | |
|---|---|---|---|
| 4,844,680 | 7/1989 | Kawata et al. | 414/331 |
| 4,932,828 | 6/1990 | Katae et al. | 414/286 |
| 5,132,949 | 7/1992 | Choi | 369/37 |
| 5,235,579 | 8/1993 | Ross | 364/478.02 |
| 5,644,558 | 7/1997 | Inatani et al. | 369/30 |
| 5,721,715 | 2/1998 | Mitani et al. | 369/33 |
| 5,726,960 | 3/1998 | Yoshida et al. | 369/34 |

*Primary Examiner*—William J Klimowicz
*Attorney, Agent, or Firm*—Armstrong, Westerman, Hattori, McLeland & Naughton

[57] ABSTRACT

A disk playback device comprises a magazine having a plurality of disk spaces for accommodating disks in an upright position, and an inlet-outlet portion provided externally of the magazine for permitting the disk to pass therethrough into the magazine from outside a device main body. Sensors for detecting loading of the disk into the magazine are disposed beside a path of travel of the disk and connected to a processor for storing information as to presence or absence of the disk in each of the disk spaces. The device main body has an automatic loading mode wherein an empty disk space having no disk accommodated therein is searched for based on the information stored in the processor as to presence or absence of the disk, the magazine is rotated to position the empty disk space as opposed to the inlet-outlet portion and the operation to search for an empty disk space is repeated again after completely loading a disk into the empty disk space.

4 Claims, 18 Drawing Sheets

FIG.14

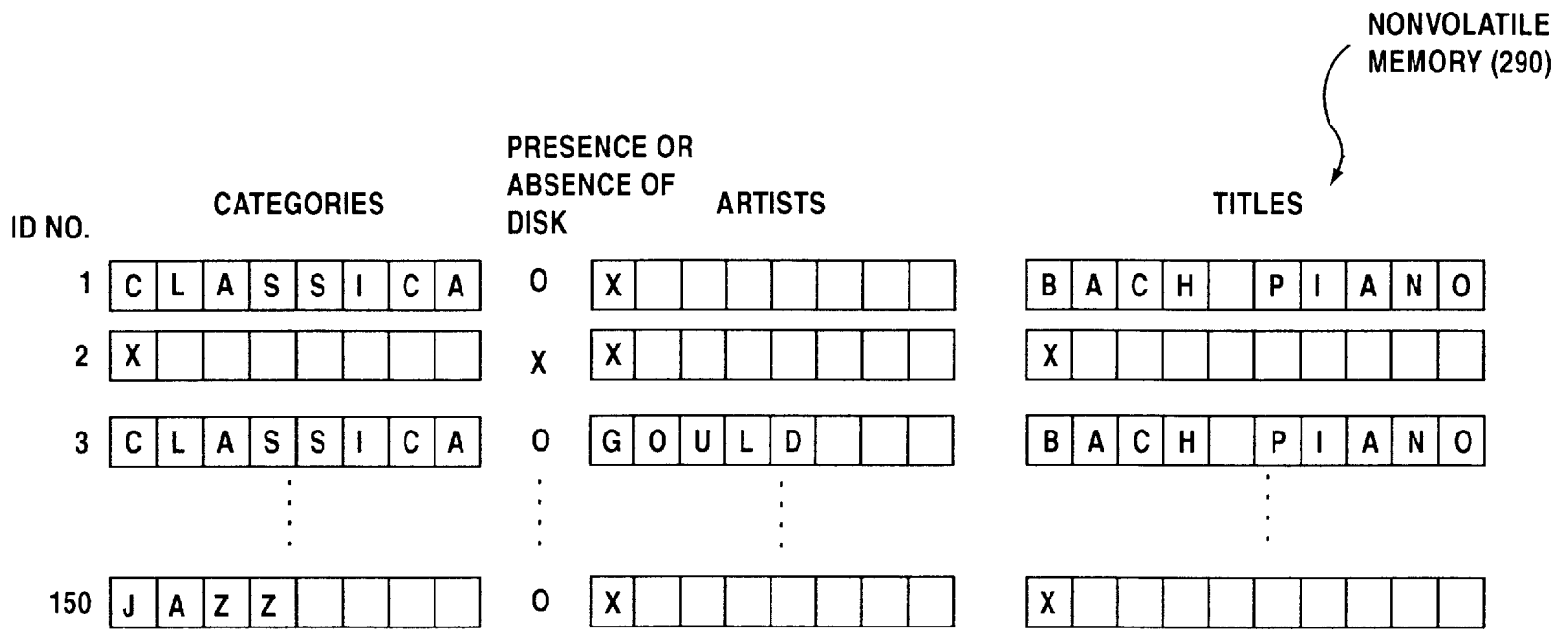

NONVOLATILE MEMORY (290)

| ID NO. | CATEGORIES | PRESENCE OR ABSENCE OF DISK | ARTISTS | TITLES |
|---|---|---|---|---|
| 1 | C L A S S I C A | O | X | B A C H   P I A N O |
| 2 | X | X | X | X |
| 3 | C L A S S I C A | O | G O U L D | B A C H   P I A N O |
| ... | ... | ... | ... | ... |
| 150 | J A Z Z | O | X | X |

DISK RECORDING-PLAYBACK DEVICE AND DISK LOADING OR UNLOADING METHOD

FIELD OF THE INVENTION

The present invention relates to a disk recording-playback device of the autochanger type wherein a plurality of disks are accommodated for recording on or playing back the desired disk, and to a method of loading disks into the device or unloading the disk from the device.

BACKGROUND OF THE INVENTION

FIGS. 15 to 17 show a recording-playback device of the autochanger type proposed by the inventors of the present invention and comprising a magazine for accommodating a plurality of disks as positioned upright for playing back the desired disk (see U.S. Pat. No. 5,615,184). In the following description, the direction in which the disk is loaded will be referred to as the "front," and the disk unloading direction as the "rear."

The device comprises a magazine 3 formed with 24 disk spaces 31 in a radial arrangement and rotatably mounted on a chassis 2 within the main body 100 of the device, and an inlet-outlet portion 4 and recording-playback unit 7 arranged outside the path of rotation of the magazine 3 and spaced apart from one another.

The inlet-outlet portion 4 has a roller unit 6 disposed between the outer wall of the device main body 100 and the magazine 3 for holding and transporting the disk. The roller unit 6 is provided at opposite sides thereof with sensors SE3 to SE8 for detecting the passage of the disk. The disk spaces 31 are assigned respective identification numbers, No. 1 to No. 24, which are stored in a processor 200 connected to a front panel 20 of the main body 100.

When a disk is inserted into the inlet-outlet portion 4, the sensors SE3 to SE8 detect the passage of the disk, which enters the magazine disk space 31 opposed to the inlet-outlet portion 4. With reference to signals from the sensors SE3 to SE8, the processor 200 stores data indicating that the disk has been inserted into the space 31.

The front panel 20 is provided with a display 330 for displaying, for example, an operating state. With reference to FIG. 17, the display 330 has an indicator 300 comprising segments 310 each comprising a circular-arc contour surrounding the identification number of each disk space 31. The processor 200 turns on the segment 310 corresponding to the disk space 31 into which the disk is placed.

When on, the segment 310 indicates that the magazine disk space 31 of the corresponding number has a disk accommodated therein. If the segment 310 is off, the disk space 31 of the corresponding number is empty with no disk placed therein.

When placing a disk into the device main body 100, the user searches for a vacant disk space 31 with reference to the information represented by the segments 310 of the indicator 300 and enters the identification number of the vacant space 31 on the front panel 20. The magazine 3 rotates, positioning the disk space 31 of the identification number as opposed to the inlet-outlet portion 4 and preparing space for the accommodation of the disk.

Another device has been provided in recent years onto which disks are loaded as classified according to the type of music recorded thereon into groups such as jazz and classical music, so that when a particular group is specified by an input for playing, the disks belonging to the group are played one after another. The inventors of the present invention have previously proposed such a device, which is shown in FIGS. 18 and 19 (see JP-B-176176/1995).

With this device, a magazine 3 is connected to a disk select-takeout mechanism 450. The disk is taken out from the magazine 3 by the select-takeout mechanism 450 and sent to a recording-playback portion 7.

The disk select-takeout mechanism 450 is connected to a system controller 600, which is in turn connected to a front panel 20 having various manual keys and to a memory 290 having stored therein data as to the groups. The system controller 600 comprises a group register means 610 for causing the memory 290 to store the name of the group keyed in on the front panel 20, group indicator means 650 for indicating the name of the group on the front panel 20 and autoplayer means 620. As shown in FIG. 19, the front panel 20 has a display 330, on which the output from the group indicator means 650 is shown in a group indicator box 370a.

When a disk is to be placed into the magazine 3, the name of group to which the disk belongs is entered on the front panel 20. The group register means 610 stores the identification number of the disk space 31 accepting the disk and the group name in the memory 290.

When the disk is to be played, the name of the group is entered via the front panel 20, whereupon the group register means 610 searches the memory 290 for a particular disk space 31 accommodating a disk in the group, and transmits the data to the autoplayer means 620. The autoplayer means 620 gives the disk select-takeout mechanism 450 a command to take out the disk from the disk space 31, and operates the recording-playback portion 7 to play the selected disk.

On completion of playing, the group register means 610 is notified of this, and searches the memory 290 for the next disk to be played. In this way, the disks belonging to the specified group are played one after another.

However, the devices described above have the following problems.

1. When a disk is to be placed into the magazine 3 of the device shown in FIGS. 15 to 17, there is a need to locate an empty disk space 31, enter the identification number of the disk space and rotate the magazine 3 every time the empty space is found. This procedure is cumbersome when many disks are to be invented.
2. Such devices are used chiefly indoors. However, with automobile stereo systems and portable players placed into wide use, disks are frequently used outdoors. There is a case wherein disks belonging to a specified group are withdrawn from the magazine 3 for outdoor use.

With the device shown in FIG. 18, the identification numbers of the disk spaces 31 containing the disks belonging to the specified group must be entered one-by-one on the front panel 20 to repeat the disk taking out operation, hence a cumbersome procedure. Although the disks belonging to the specified group can be played in succession on the conventional device, the disks can not be taken out successively.

Furthermore, it may be desired to stow the disks belonging to the same group and used outdoors into the magazine 3 as originally positioned therein, whereas the conventional device fails to meet such a need.

SUMMARY OF THE INVENTION

An object of the present invention is to diminish the time or labor required for stowing a multiplicity of disks into a magazine.

Another object of the invention is to make it possible to successively load disks belonging to a particular group into the magazine or unload the disks therefrom in succession.

The present invention provides a disk recording-playback device which comprises an inlet-outlet portion 4 for permitting disks to pass therethrough, and sensors arranged in the inlet-outlet portion 4 beside the path of travel of the disk for detecting loading of the disk into a magazine 3, the sensors being connected to a processor 200 for storing information as to the presence or absence of the disk in each of disk spaces 31. The main body 100 of the device has an automatic loading mode wherein an empty disk space 31 having no disk accommodated therein is searched for based on the information stored in the processor 200 as to the presence or absence of the disk, the magazine 3 is rotated to position the empty disk space 31 as opposed to the inlet-outlet portion 4, and the operation to search for next empty disk space 31 is repeated again after completely loading a disk into the empty disk space. The device main body 100 is provided with an operation key for setting the main body 100 in the automatic loading mode.

The disk recording-playback device comprises first memory means for storing information as to the presence or absence of the disk in each disk space 31, second memory means for storing for each disk space the name of a group to which belongs the disk to be accommodated in the disk space, and automatic loading-unloading means 630 for searching the second memory means for the disk space 31 assigned the same group name as a selected group name and searching the first memory means for the information as to the presence or absence of the disk within the disk space 31 assigned the group name. The automatic loading-unloading means 630 has the function of setting the main body of the device in an automatic loading mode when no disk is present in any of all disk spaces 31 assigned the same group name to draw a disk into the magazine 3, or alternatively setting the device main body in an automatic unloading mode when at least one disk is contained in the disk spaces assigned the same group name to unload the disk from the magazine 3 toward the inlet-outlet portion 4.

When the operation key is pressed to set the device main body 100 in the automatic loading mode, the means 630 automatically searches for a disk space 31 containing no disk with reference to the information stored in the processor 200 as to the presence or absence of the disk. The magazine 3 is then rotated to position the empty disk space 31 as opposed to the inlet-outlet portion 4. When a disk has been loaded completely, the operation to search for an empty disk space 31 is repeated.

With the device main body 100 thus set in the automatic loading mode, disks can be loaded into the magazine one after another without the necessity of the user manipulating the front panel 20 every time the disk is to be loaded. The cumbersome procedure for manipulating the front panel 20 can be eliminated especially when many disks are to be loaded. The device is therefore convenient to use.

When the automatic loading-unloading means 630 sets the device main body 100 in the automatic unloading mode based on the information retrieved from the first and second memory means, disks are unloaded one after another from the disk spaces belonging to the same group. Accordingly, the disks of specified group only can be taken out from the magazine 3 conveniently for outdoor use.

In the case where the disks of the same group used out-of-doors are to be stowed into the respective disk spaces as initially accommodated, the device main body 100 is set in the automatic loading mode. The disks are then successively loaded into the respective original spaces 31 again. This diminishes the time and labor required for insertion into the magazine 3.

BRIEF DESCRIPTION OF THE DRAWINGS

FIG. 14 is a diagram showing tables within a nonvolatile memory;

DESCRIPTION OF THE PREFERRED EMBODIMENT

An embodiment of the invention will be described below in detail with reference to the drawings concerned.

Figure 1:
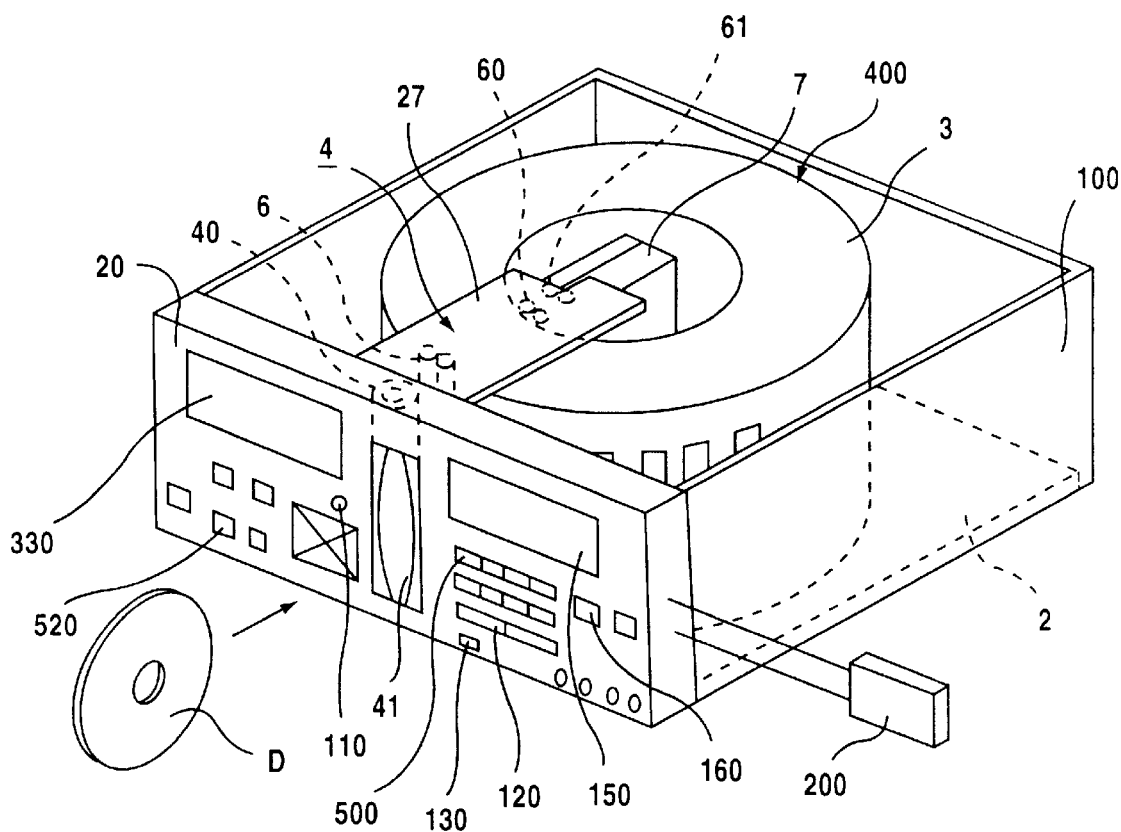
FIG. 1 is a perspective view showing a disk recording-playback device.

FIG. 1 is a perspective view of a device main body 100. A front panel 20 provided at the front side of a chassis 2 has connected thereto a processor 200 comprising a microcomputer. A rotary shutter 40 provided in the center of the front panel 20 is centrally formed with an opening 41 for passing a disk D therethrough.

A display 330 for showing, for example, the state of accommodated disks is provided on the left side of the opening 41, and a transparent window 150 for permitting the user to view the interior of the device main body 100 on the right side of the opening 41. Arranged on the front panel 20 are a load/eject button 130 to be pressed for loading or unloading the disk D, entry keys 500 each bearing a numeral or English character, a memory key 520 to be pressed for entering the names of groups, magazine rotation buttons 120 to be pressed for loading another disk after loading a disk, a stop button 160 for stopping operations, and a play button 170 to be pressed for playing a disk. The names of groups are the names of categories of music, such as jazz and classical music, to which disks belong, and further include other desired classification names such as the names of artists playing the music recorded on disks and the titles of melodies.

Figure 2:
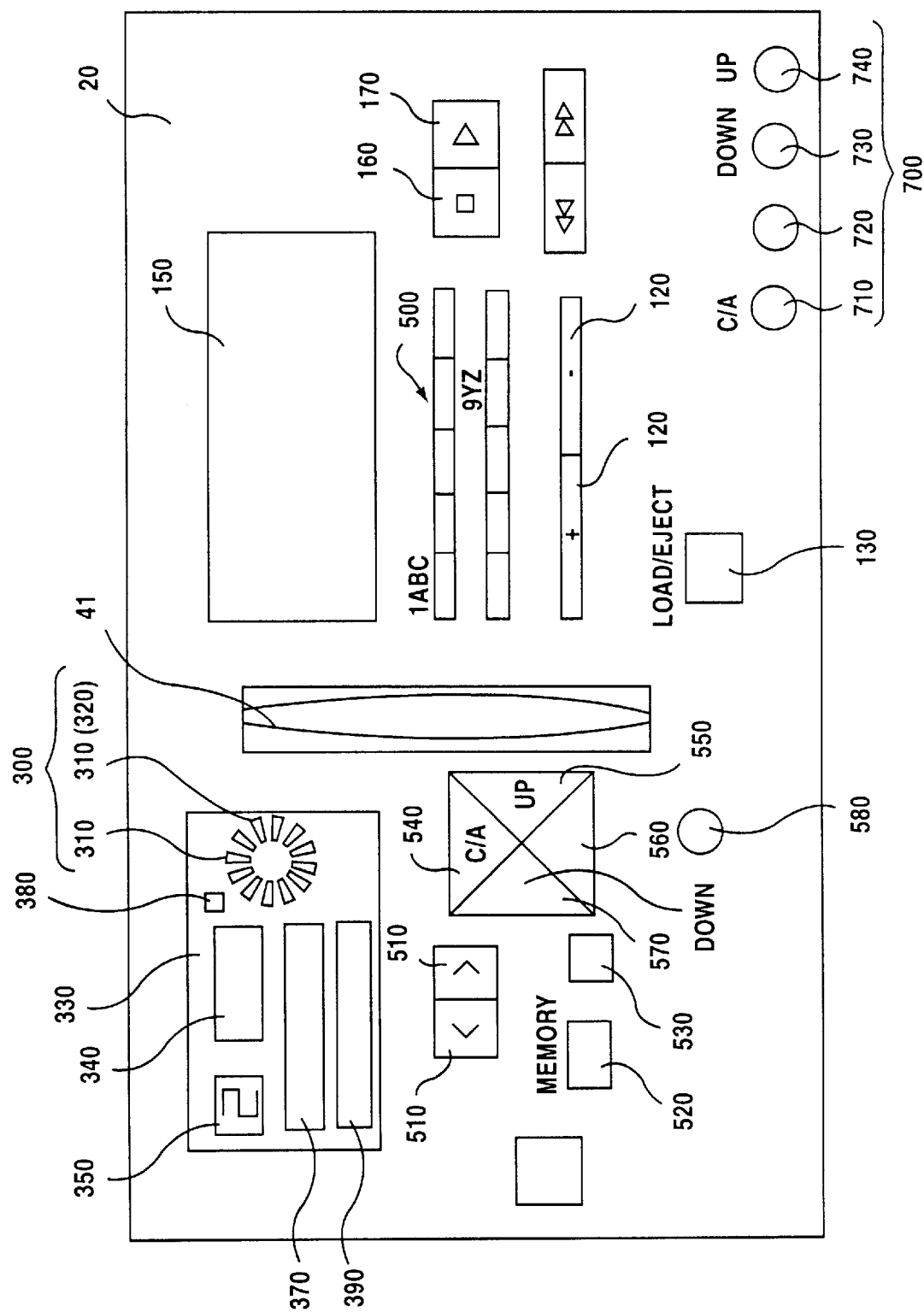
FIG. 2 is a front view of a front panel.

FIG. 2 is a front view of the front panel 20. Cursor keys 510, 510 are arranged between the display 330 and the memory key 520. Provided at the right side of the cursor keys 510 are four triangular keys, i.e., a category/artist key 540, up key 550, title key 560 and down key 570 which are arranged clockwise. The up key 550 or the down key 570 is used for displaying the names of categories or artists one after another. The title key 560 is used by the user for keying in the titles of disks.

The display 330 has a number indicating lamp 350 at its upper left corner for displaying the identification numbers of the disk spaces 31, and a character indicating box 340 at the right of the lamp for showing the duration of playing of disks, playing track numbers, etc. Disposed below the character indicating box 340 is a category/artist indicating box 370 for showing the names of groups of disks. Provided on the right side of the box 370 is an indicator 300 comprising a plurality of segments 310 which are in a circular arrangement and can be lighted up.

Four automatic operation keys are arranged in a horizontal row as a group 700 in a right-side lower end portion of the front panel 20 for use in the automatic playing mode and automatic loading-unloading mode to be described later. These keys are a C/A change-over key 710 for changing over the indication of group names of disks, title key 720, down key 730 and up key 740. The down key 730 or up key 740 is pressed when the names of categories or the names of artists are indicated one after another.

Figure 3:
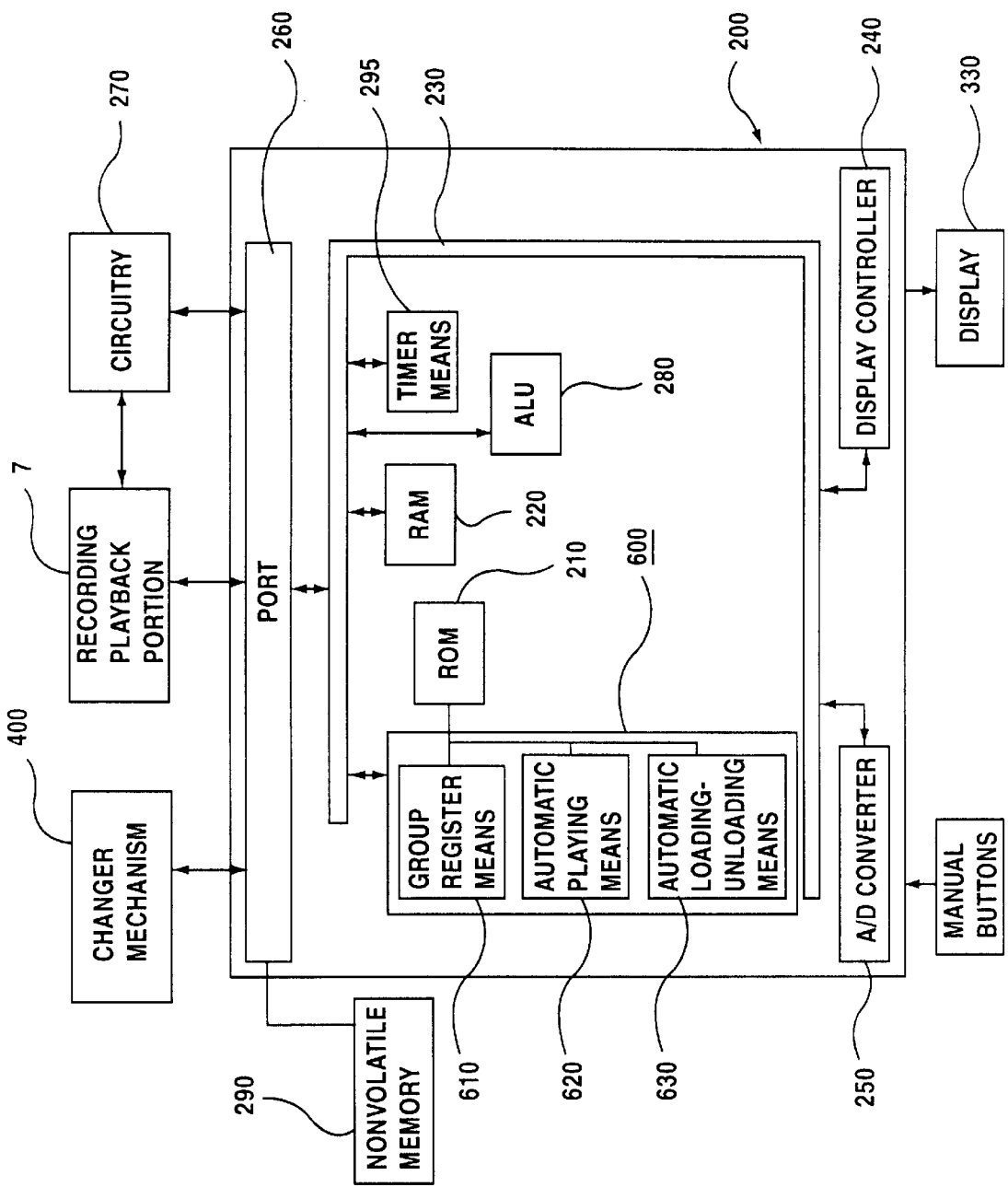
FIG. 3 is a circuit block diagram showing the interior of main body of the device.

FIG. 3 is a block diagram showing the interior of the device main body 100. The entry keys 500 and the load/eject button 130 are connected to an A/D converter 250 within the processor 200. The A/D converter 250 is connected via a bus line 230 to a RAM 220 for temporarily storing information, timer means 295 for measuring the time elapsed after the input of information, an arithmetic logic unit (ALU) 280, a ROM 210 holding various programs to be executed and system control means 600. Via a port 260 providing output terminals, the system control means 600 and the RAM 220 are connected to a changer mechanism 400, recording-playback portion 7 for recording signals on disks or playing disks, and circuitry 270 for controlling the operation of the recording-playback portion 7. The operation of the recording-playback portion 7 and the circuitry 270 is already known and will not be described in detail.

The display 330 is connected to the bus line 230 by way of a display controller 240. The signals from manual buttons on the front panel 20 and the RAM 220 are transmitted via to the display 330. The port 260 has connected thereto a nonvolatile memory 290 for retaining information even if the power supply is turned off. The system control means 600 is connected to the ROM 210, which has stored therein the names of categories indicating fields of music. The nonvolatile memory 290 has stored therein the names of categories, the names of artists playing music or the titles of melodies assigned to the identification numbers of disk spaces 31.

The system control means 600 comprises group register means 610, automatic playing means 620 and automatic loading-unloading means 630 for performing respective operations assigned according to the programs in the ROM 210.

The group name entered on the front panel 20 is stored by the group register means 610 in the nonvolatile memory 290. The automatic playing means 620 searches the nonvolatile memory 290 based on the specified group name and executes a procedure for automatically playing in a predetermined order the disks within the disk spaces 31 which are assigned the group name. The automatic loading-unloading means 630 executes a procedure for automatically loading disks into the respective disk spaces 31 given the specified group name or automatically unloading the disks therefrom, the disks being thus handled in a predetermined order. These procedures will be described later in detail.

The present embodiment is characterized in that disks can be loaded into the changer mechanism 400 one after another, and that disks belonging to each category can be automatically loaded or unloaded in succession. The changer mechanism 400 will be described first.

Figure 4:
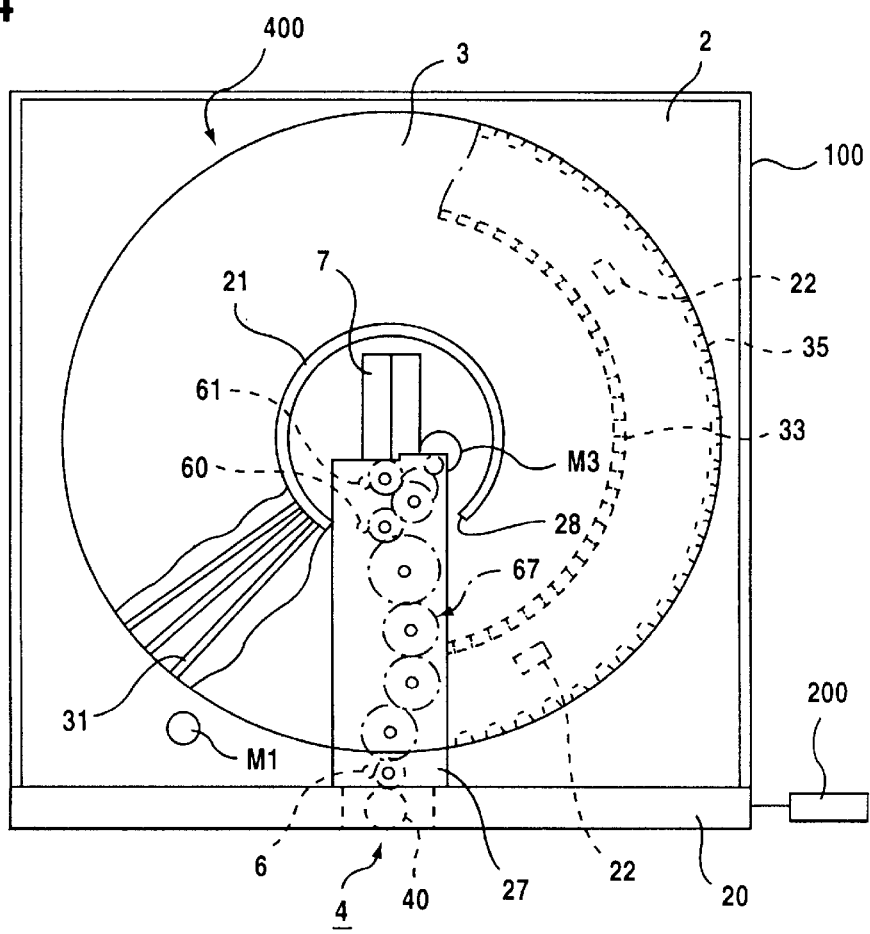
FIG. 4 is a plan view of the device.

FIG. 4 is a plan view showing the changer mechanism 400 shown in FIG. 1. The changer mechanism 400 has a magazine 3 in the form of a double cylinder and rotatably mounted on the chassis 2 for accommodating a plurality of disks D in a radial arrangement. The recording-playback portion 7 is disposed in the inside space of the magazine 3, and an inlet-outlet portion 4 is disposed outside the path of rotation of the magazine 3 inwardly of the front panel 20.

A first roller unit 6 for holding and transporting the disk is provided within the inlet-outlet portion 4 on the path of transport of the disk. Provided between the inner wall of the magazine 3 and the recording-playback portion 7 are second and third roller units 60, 61 arranged along the direction of loading of the disk for similarly holding the disk.

A motor M1 for rotating the magazine 3 is disposed outside the path of rotation of the magazine 3. A motor M3 for rotatingly driving the three roller units 6, 60, 61 is disposed in the inside space of the magazine 3. The torque of the motor M3 is transmitted to the second and third roller units 60, 61, and also to the first roller unit 6 via a gear train 67. The load/eject button 130 is pressed to draw a disk into the magazine 3 by energizing the motor M3 and rotating the first roller unit 6.

The magazine 3 is rotatably fitted at its lower end to an annular support post 21 provided upright on the chassis 2. The support post 21 is locally formed with a cutout 28 for permitting passage of the disk therethrough.

Figure 5:
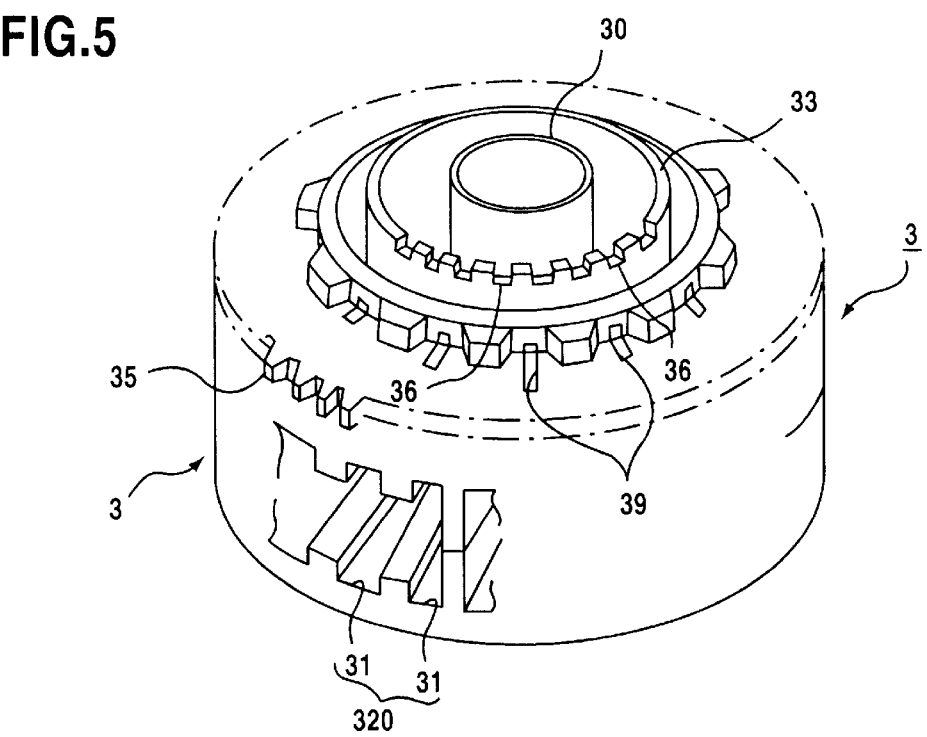
FIG. 5 is a plan view showing a magazine as turned upside down.

FIG. 5 is a perspective view showing the magazine 3 as turned upside down, with its bottom side up. The magazine 3 has 150 disk spaces 31 in a radial arrangement for accommodating disks as positioned upright. Each disk space 31 has opposite ends having an opening formed respectively in the inner and outer walls of the magazine 3. The opening is in the form of a slit for passing the disk therethrough. The magazine 3 has a bottom wall periphery formed with an annular toothed portion 35. Provided on the lower surface of bottom wall of the magazine 3 is a first rib ring 33 concentric with the magazine 3. The ring 33 has hollow windows 36 equidistantly spaced apart and equal in number to the number of the disk spaces 31.

With the magazine 3 mounted on the chassis 2, the disk spaces 31 are given respective groove numbers, i.e., No. 1 to No. 150, in a counterclockwise direction. Six adjacent disks spaces 31 are defined as a block 320, such that all the disk spaces 31 are divided into 25 blocks 320.

The display indicator 300 shown in FIG. 2 comprises 25 segments 310 corresponding to the respective blocks 320 and each indicating the presence or absence of disks in disk spaces 31 of the block 320. Stated more specifically, if the disk is present in one of the disk spaces 31 of the block 320, the corresponding segment 310 is lighted up.

Figure 6:
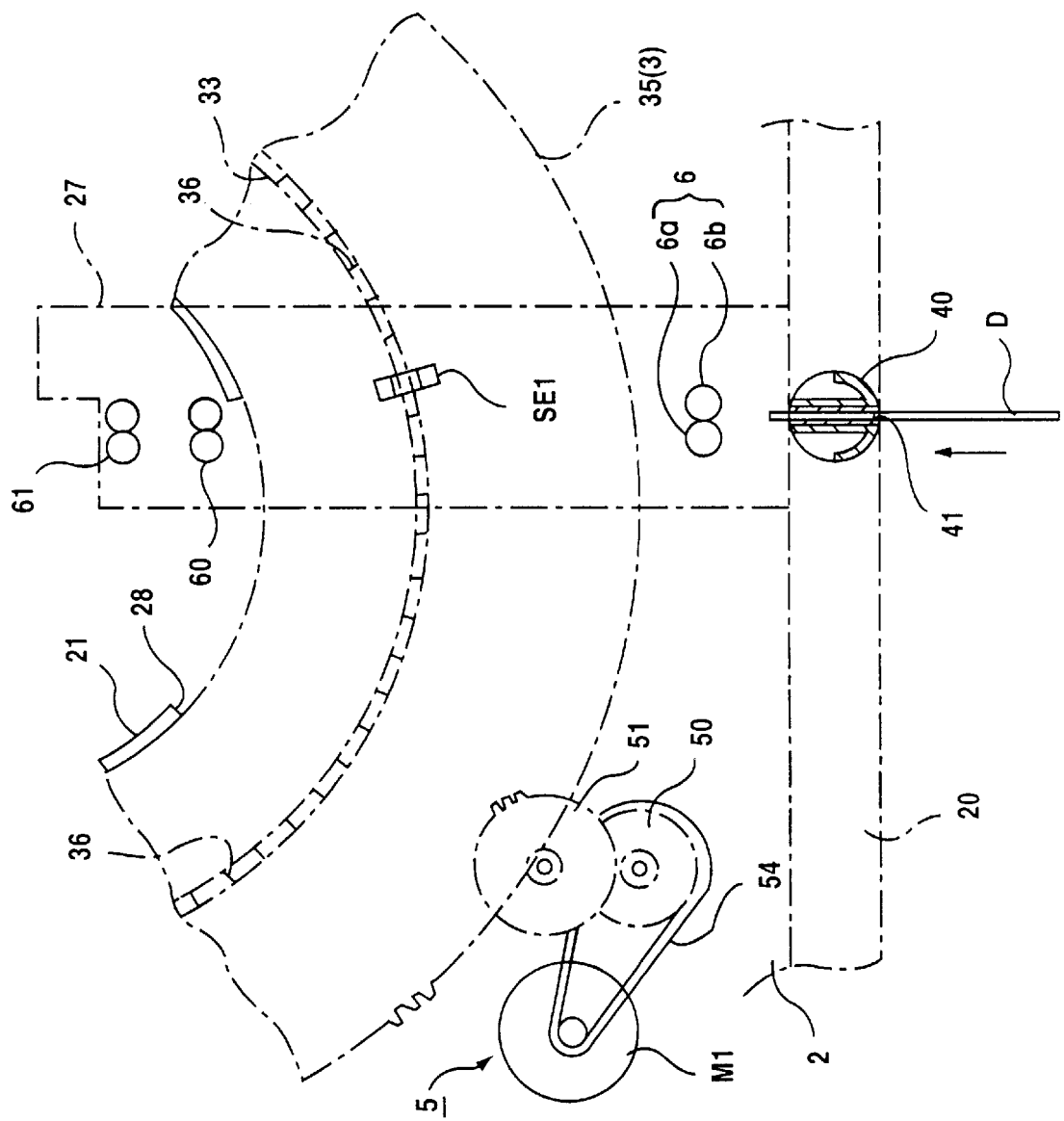
FIG. 6 is a plan view of a magazine rotating mechanism.

FIG. 6 is a plan view showing a magazine rotating mechanism 5 provided on the chassis 2. The motor M1 is coupled to the annular toothed portion 35 of the magazine 3 by a belt 54 and two double gears 50, 51 for rotating the magazine 3 in response to an input from the front panel 20.

Provided on the path of rotation of the first rib ring 33 of the magazine 3 is a sensor SE1 for detecting windows 36 with the rotation of the magazine 3. The windows 36 of the magazine 3 are arranged at equal spacings and equal in number to the number of disk spaces 31, so that when the sensor SE1 detects passage of one window 36 and thereafter detects passage of the next window 36, this indicates that the magazine 3 has rotated by an amount corresponding to one disk space 31.

Although not shown, the magazine 3 is formed with a positioning hole serving as a reference. The positioning hole, when detected during the rotation of the magazine 3, indicates that the disk space 31 opposed to the inlet-outlet portion 4 corresponds to the identification number 1. Accordingly, the number of windows 36 detected by the sensor SE1 during the rotation of the magazine 3 thereafter identifies the disc space 31 of particular identification number as opposed to the inlet-outlet portion 4 and enables the RAM 220 to store the identification number.

Figure 7:
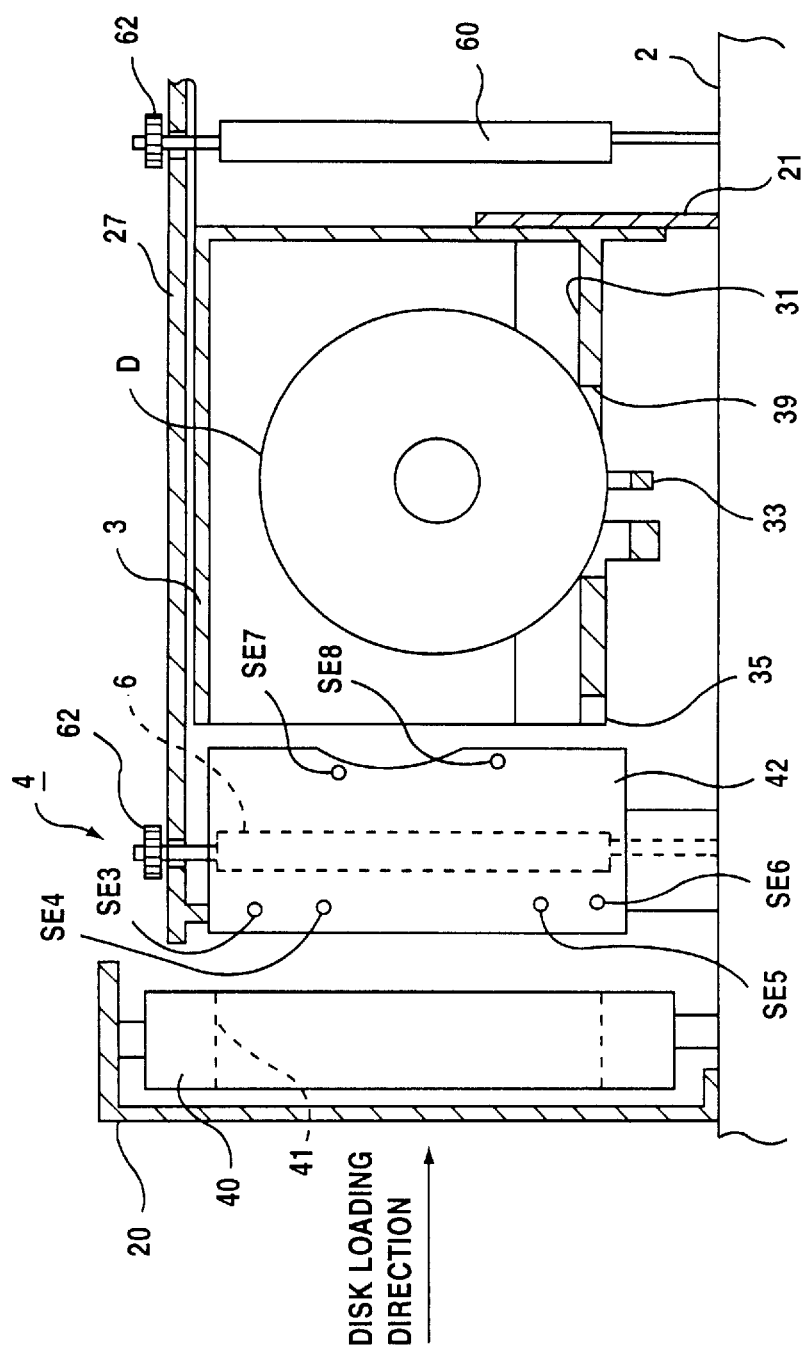
FIG. 7 is a right side elevation showing the relationship between the magazine and sensors with respect to position.

FIG. 7 is a right side elevation of the inlet-outlet portion 4. The inlet-outlet portion 4 includes the first roller unit 6. Six sensors SE3 to SE8 for detecting the passage of disks are mounted on sensor base plates 42 provided on the respective opposite sides of the first roller unit 6. The six sensors are provided in order to distinguish two types of disks during passage, i.e., those having a diameter of 12 cm and those having a diameter of 8 cm.

[Manual Loading of Disks, see FIGS. 6, 2, 1 and 8]

Figure 8:
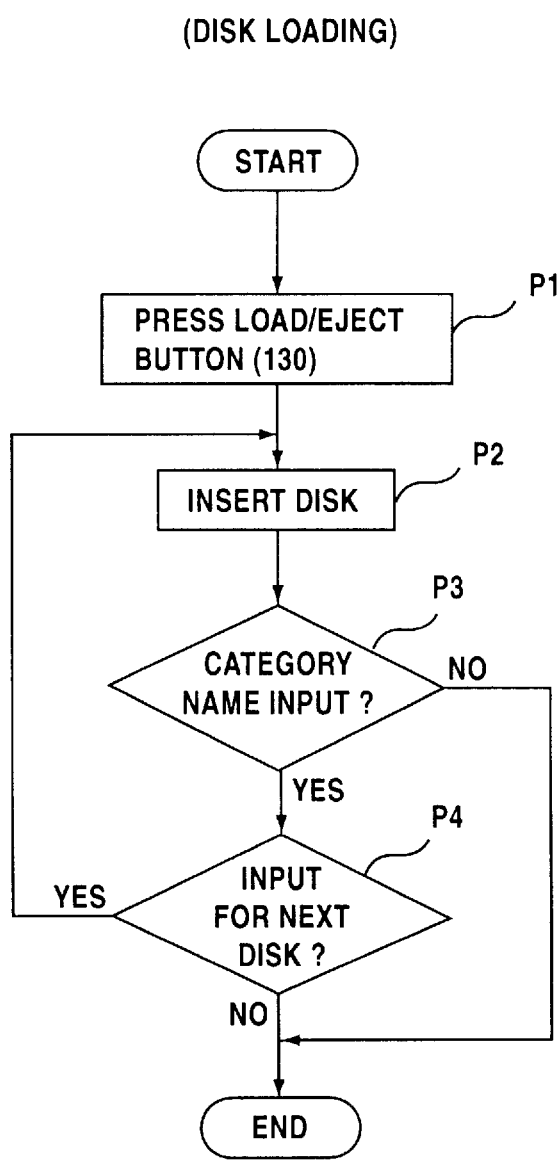
FIG. 8 is a flow chart showing a procedure for loading disks with a category specified.

When disks are to be loaded into the magazine 3 manually one by one, the procedure shown in the flow chart of FIG. 8 is performed.

When the device is energized, the identification number of the disk space 31 opposed to the inlet-outlet portion 4 is shown on the number indicating lamp 350 on the display 330 shown in FIG. 2. The identification number is stored in the RAM 220. When no disk is present in the space 31, the ALU 280 operates the display controller 240 to show "NO DISK" on the character indicating box 340 on the display 330. Recognizing the indication "NO DISK," the user presses the load/eject button 130 (P1).

The characters "LOAD DISK" are shown in the category/artist indicating box 370, whereupon the user places the disk into the opening 41 shown in FIG. 7 (P2). The sensors SE3 to SE6 detect the presence of the disk, energizing the motor M3. The first roller unit 6 rotates in the disk drawing-in direction. Upon the sensors SE7, SE8 detecting the completion of passage of the disk, the processor 200 is notified of the accommodation of the disk in the space 31 opposed to the inlet-outlet portion 4. Since the RAM 220 has stored therein the identification number of the disk space 31 opposed to the inlet-outlet portion 4, the memory stores the fact that the disk has been placed into the space 31.

On completion of loading of the disk into the disk space 31, the category/artist indicating box 370 on the display 330 shows the row of characters "ENTER CATEGORY" in the form of a leftward stream of characters. The row of characters is displayed twice in succession, and if no input is entered via the front panel 20 while the character row is being shown, no category name is given (P3).

In the case where disks are to be registered for accommodation as classified according to the category, the category/artist key 540 shown in FIG. 2 is pressed once while "ENTER CATEGORY" is on display. A category registered in the ROM 210 is indicated in the category/artist indicating box 370 of the display 330 by way of the bus line 230 and the display controller 240.

The information shown in the category/artist indicating box 370 changes every time the up key 550 or down key 570 is pressed. The present applicant has proposed to show in alphabetical order the initial letters of ten fields of music starting with classical, C/W (country western) and ending with R/B (rhythm and blues), show turn music, as the information to be shown every time the up key 550 is pressed.

When the category/artist key 540 is pressed twice, the name of an artist is shown in the category/artist indicating box 370. Alternatively, the category name, as well as the artist name, can be entered by the user in the alphabet using entry keys 500. A numeral and two or three letters of the alphabet are assigned to each of the entry keys 500. For example, when "A" of the alphabet is to be entered, the entry key 500 for 1 is pressed twice. The selected latter can be fixed by pressing the cursor key 510, and a row of characters can be input by repeating the above procedure.

When the desired category name has been selected, the user presses the memory key 520. The group register means 610 in the system control means 600 stores the information as to the presence or absence of the disk and the selected category in a table of the identification numbers of the disk spaces 31 which is provided in the RAM 220 as well as in the nonvolatile memory 290 (see FIG. 14). The information is stored in the memory 290 to make it possible to retrieve the information even if the power supply is shut off as already stated.

After the category name has been entered, the magazine rotation button 120 and the load/eject button 130 on the front panel 20 are pressed to rotate the magazine 3, and the foregoing procedure is repeated, that is, disks are loaded into the magazine 3 with the name of category given (P4).

Figure 13:
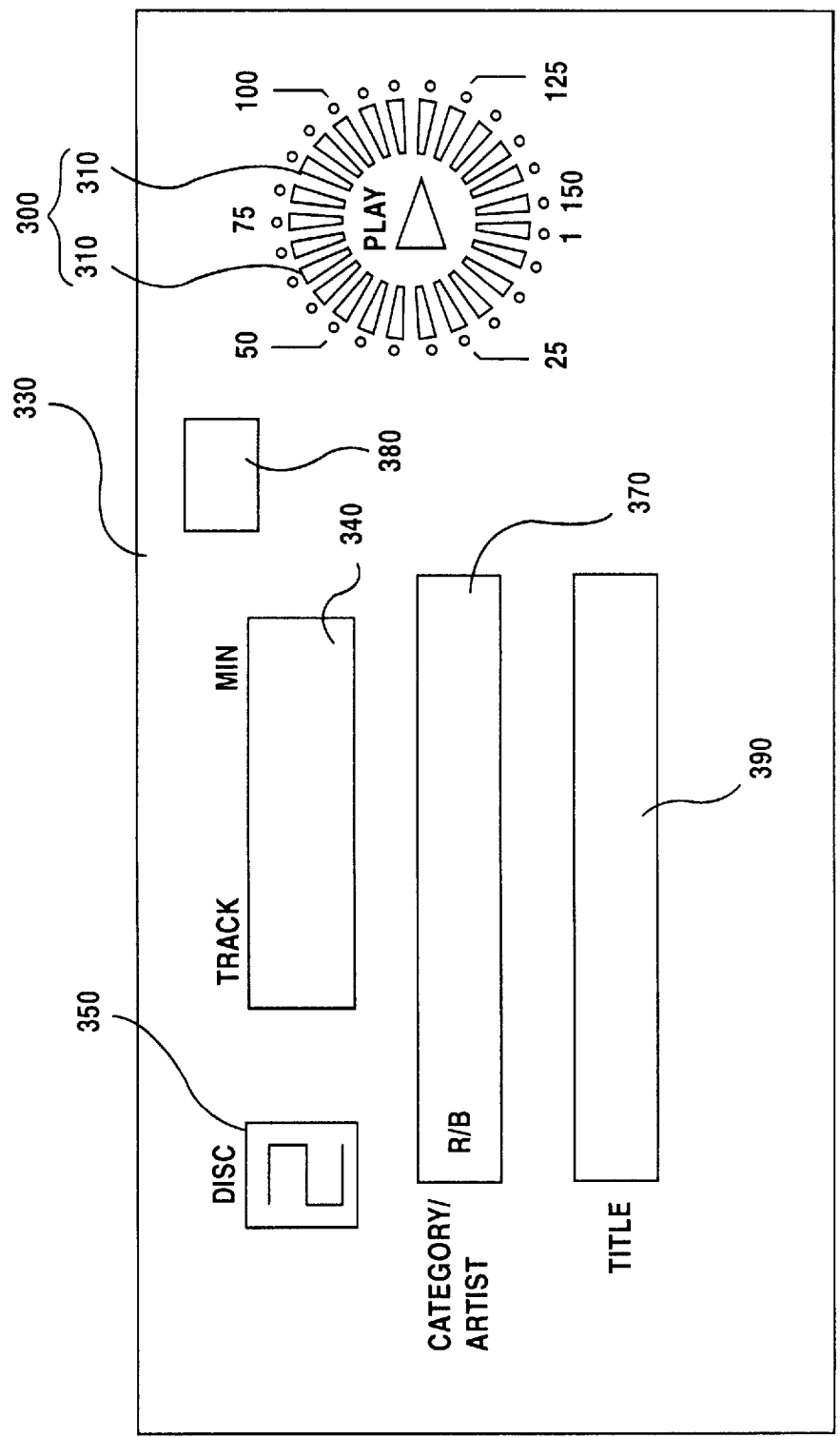
FIG. 13 is a diagram showing a display in a state wherein categories are specified.
Figure 15:
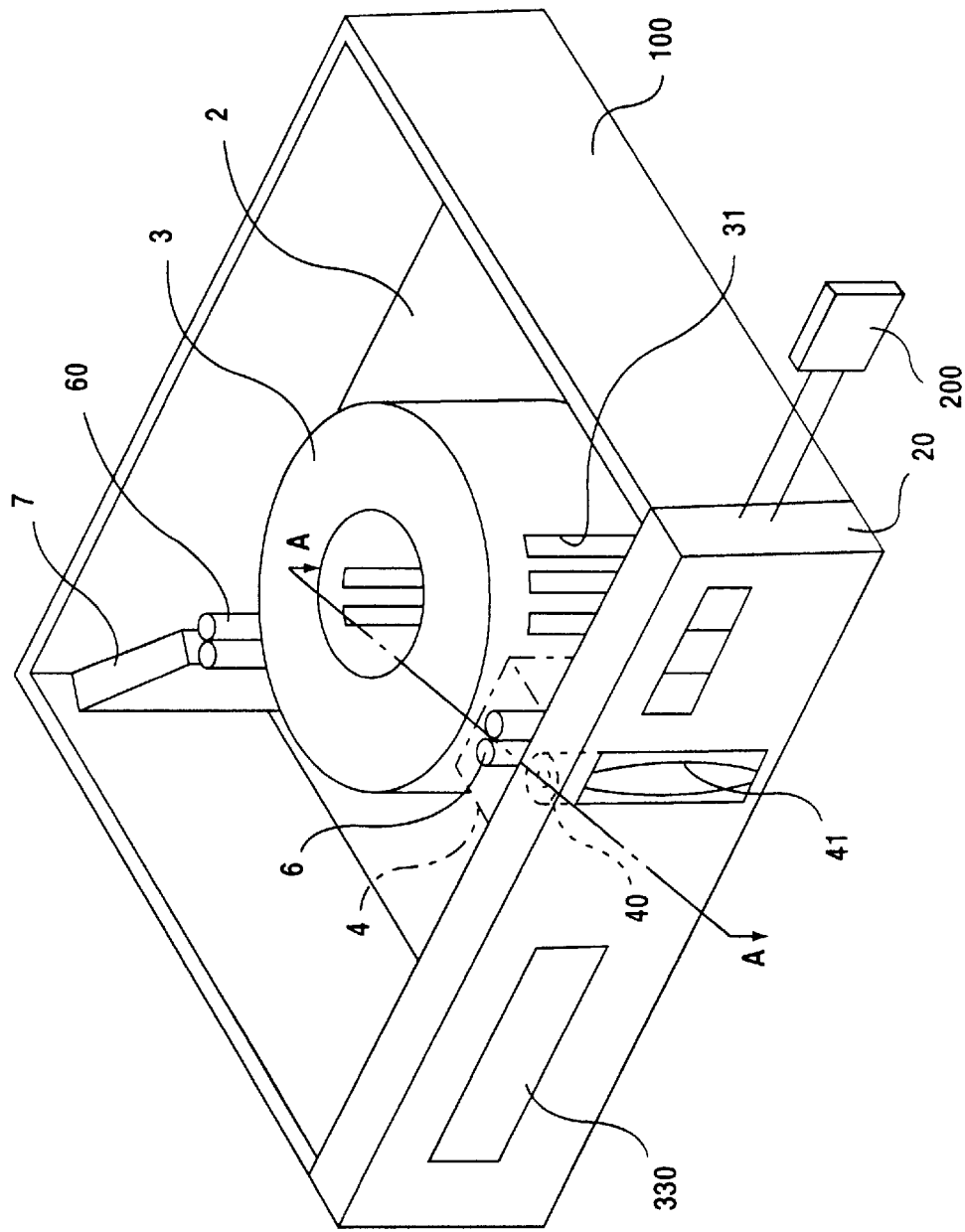
FIG. 15 is a perspective view of a conventional disk recording-playback device.
Figure 16:
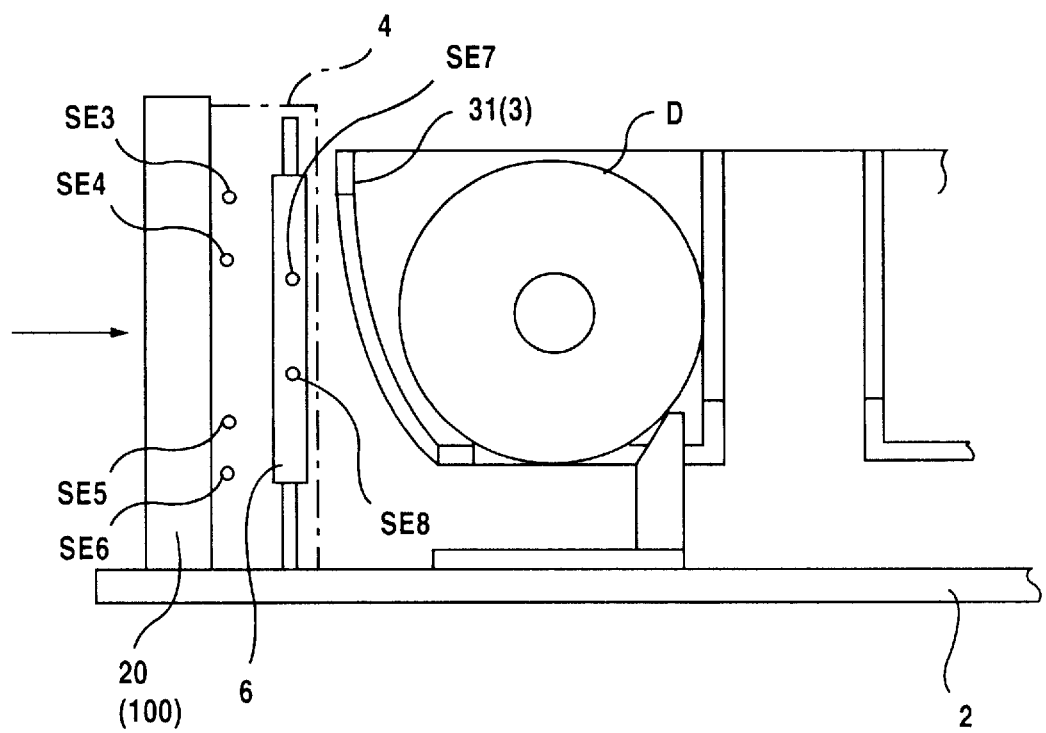
FIG. 16 is a right side elevation in section taken along the line A—A in FIG. 15.
Figure 17:
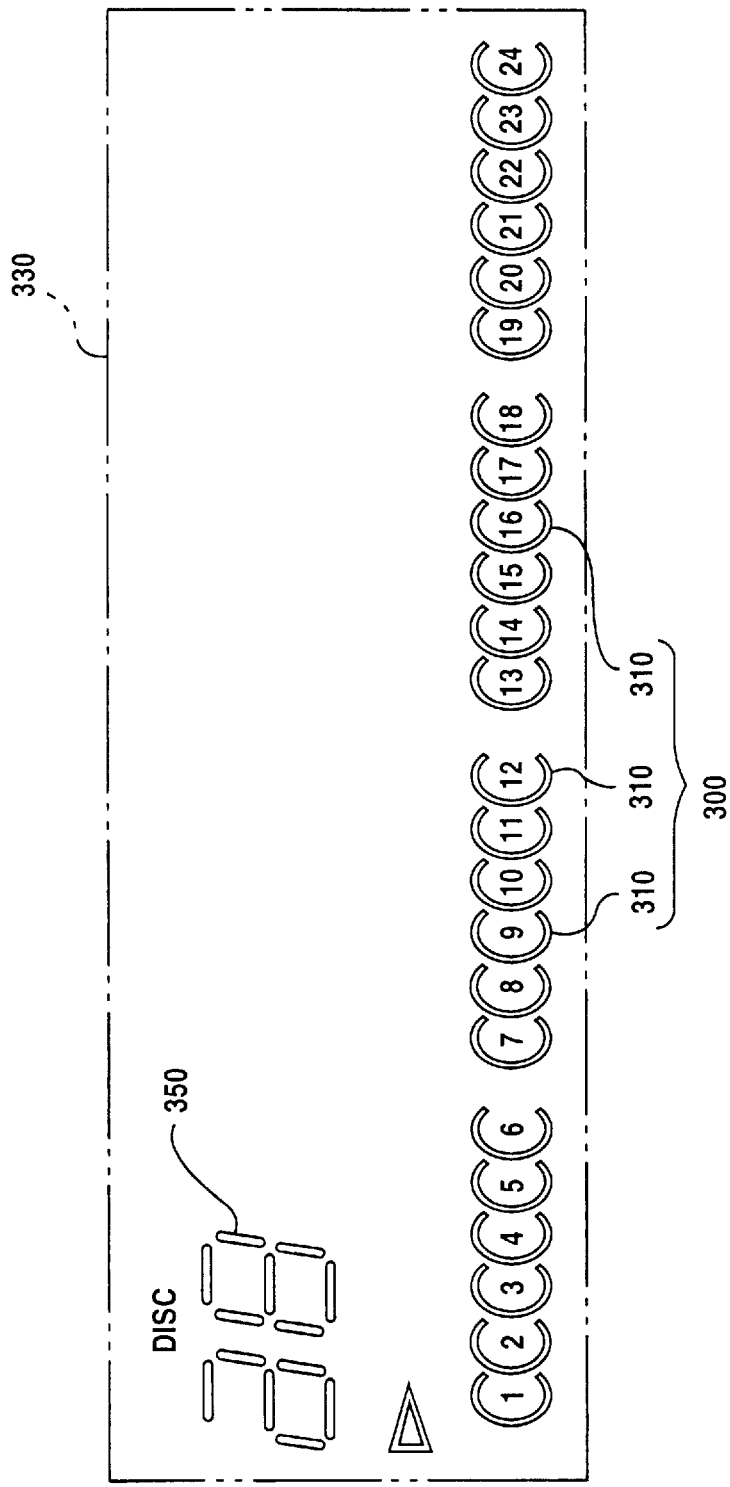
FIG. 17 is a diagram showing an arrangement of segments in the conventional device.
Figure 18:
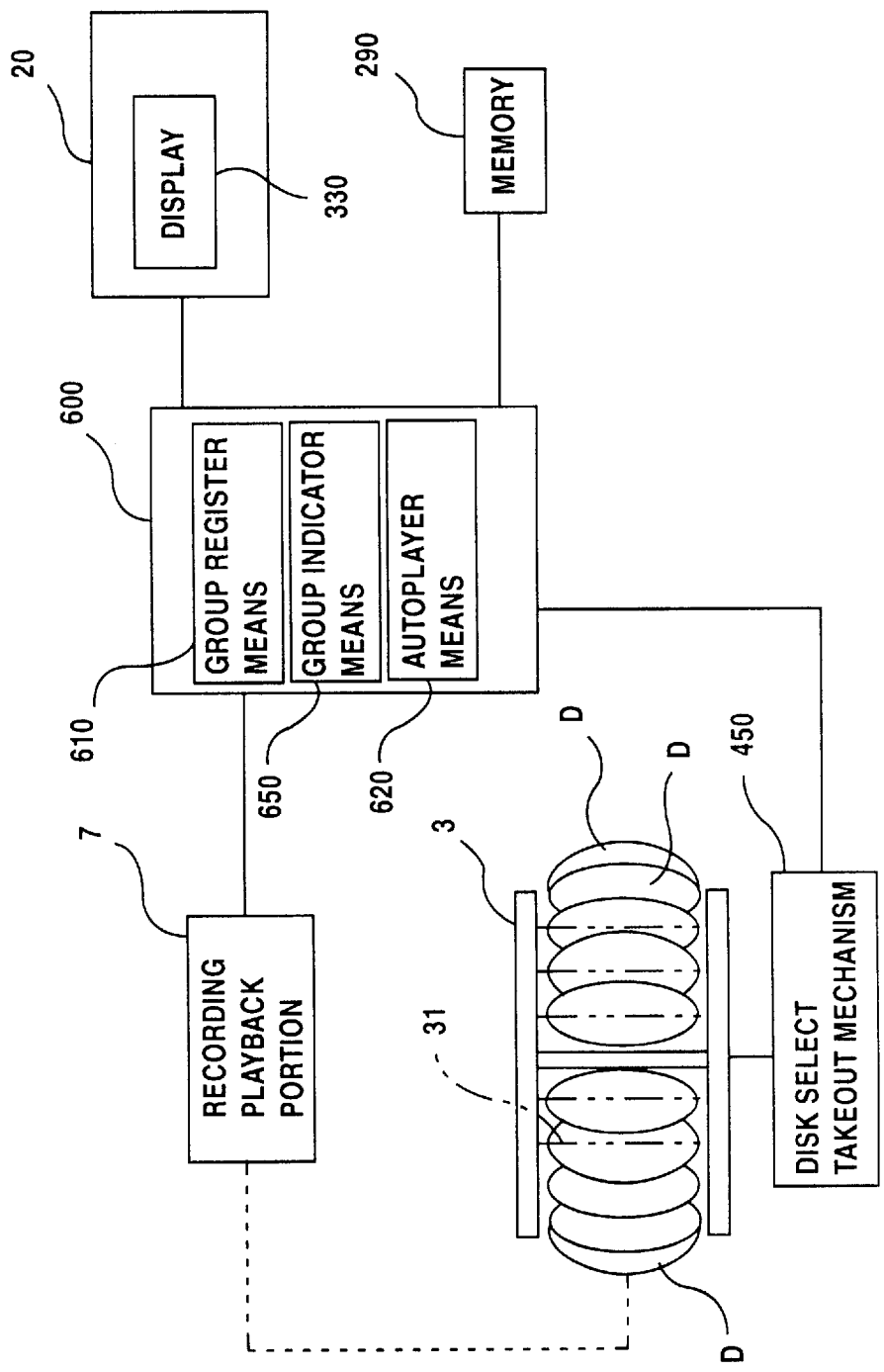
FIG. 18 is a block diagram of a conventional disk recording-playback device having an automatic playing mode.
Figure 19:
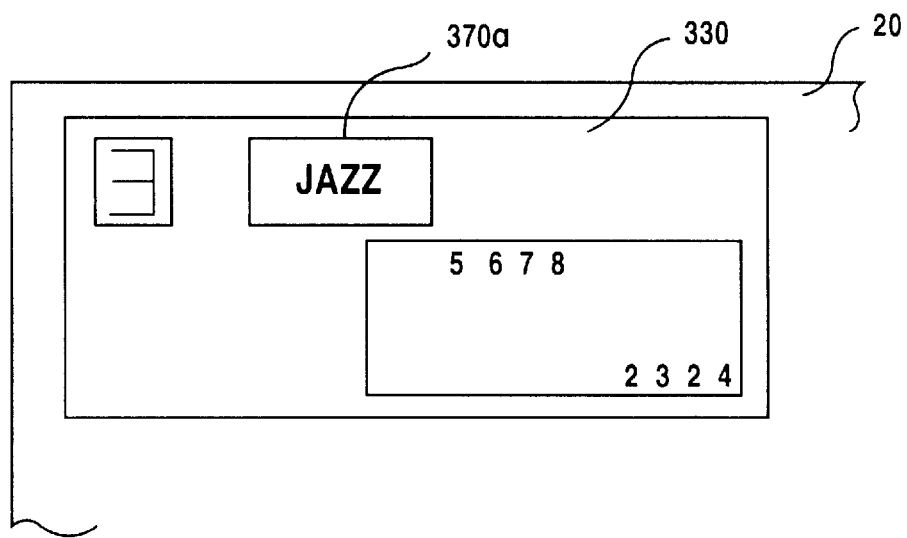
FIG. 19 is a diagram showing an indication of category on the same device.

When the category/artist key 540 is pressed for the display of the category name after the disks have been placed into the magazine 3 with the name of category given, the segments 310 corresponding to the blocks 320 including the categorized disk spaces 31 are lighted up as indicated by hatching in FIG. 13. This indicates that the categorized disk spaces 31 are included in the blocks 320.

Thus, disks are loaded into the device in two ways, that is, without inputting a category or the like, and with a category or the like registered.

Figure 9:
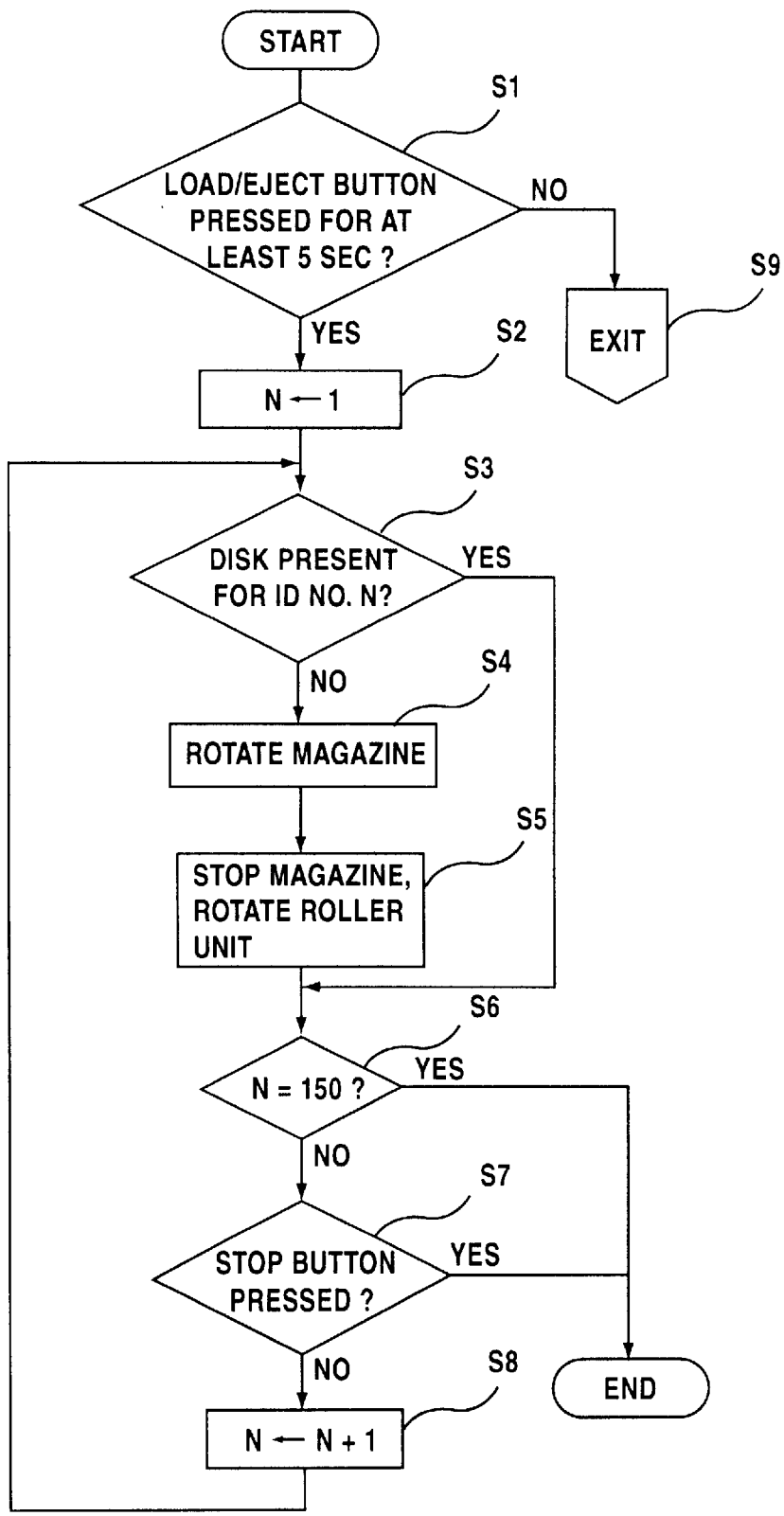
FIG. 9 is a flow chart showing an operation in an automatic loading mode.

[Automatic Loading of Disks, see FIGS. 2 and 9]

When many disks are to be loaded into the magazine 3 without being classified according to the category or artist, it requires time and is cumbersome to press the magazine rotation button 120 and the load/eject button 130 for every disk. To obviate this cumbersomeness, the present applicant has conceived the idea of automatically positioning empty disk spaces 31 as opposed to the inlet-outlet portion 4. This operation is referred to as an automatic loading mode and will be described in detail with reference to the flow chart of FIG. 9. The device is brought out of the automatic loading mode by pressing the stop button 160.

The device main body 100 is set in the automatic loading mode by holding the load/eject button 130 of FIG. 2 pressed for 5 seconds (S1), whereupon the button 130 feeds a signal to the timer means 295 via the A/D converter 250 and the bus line 230. If the button 130 is held pressed for less than 5 seconds, the device is not set in the automatic loading mode (S9). The load/eject button 130 is not only pressed when the disk is to be placed into the magazine 3 but also has the function of an operation key for initiating the automatic loading mode.

When the signal from the load/eject button 130 is held input for at least 5 seconds, the timer means 295 notifies the ALU 280 of this mode of signal input. The ALU 280 issues a command to set the automatic loading mode and retrieves a program for use in the automatic loading mode from the ROM 210.

It is assumed in the following description that the identification number of a disk space 31 to be searched for in the automatic loading mode is N. Since the present embodiment has 150 disk spaces 31, the maximum of N is 150. First, the ALU 280 sets the identification number N at 1 (S2) and checks the RAM 220 as to whether the disk space 31 with the identification number 1 contains a disk (S3). If the space 31 contains the disk, step S6 follows. If otherwise, the magazine 3 is rotated (S4) to position the disk space 31 as opposed to the inlet-outlet portion 4, whereupon the magazine 3 is halted.

The motor M3 is thereafter energized, rotating the first roller unit 6 in the disk drawing-in direction (S5). The sensors SE3 to SE8 detect completion of passage of a disk and placement of the disk into the magazine 3, whereupon the motor M3 is deenergized to stop the first roller unit 6.

Next, the ALU 280 checks whether the identification number N is the maximum, i.e., 150 (S6). If N is less than 150, the stop button 160 is checked as to whether it is on (S7). If it is on, the device is brought out of the automatic loading mode. If otherwise, 1 is added to the identification number N (S8), followed by step S3 again to check the RAM 220 as to whether the disk space 31 of next identification number contains a disk. When N is the maximum, i.e., 150, the automatic loading mode is terminated since no disk can be placed into any disk space 31.

When the device main body 100 is set in the automatic loading mode in this way, disks can be loaded one after another without the necessity of the user manipulating the front panel 20 for each of the disks. The device is convenient to use especially when many disks are to be placed into the magazine since there is no need to manipulate the front panel 20 in this case.

If the disks are registered as classified according to the category when to be loaded into the magazine 3 initially, the device main body can be set in the automatic playing mode and automatic loading-unloading mode to be described below. Although the procedure to be described below is for registering disks as classified according to the category name, the same procedure will be performed for registering as classified according to the name of artist or title.

Figure 10:
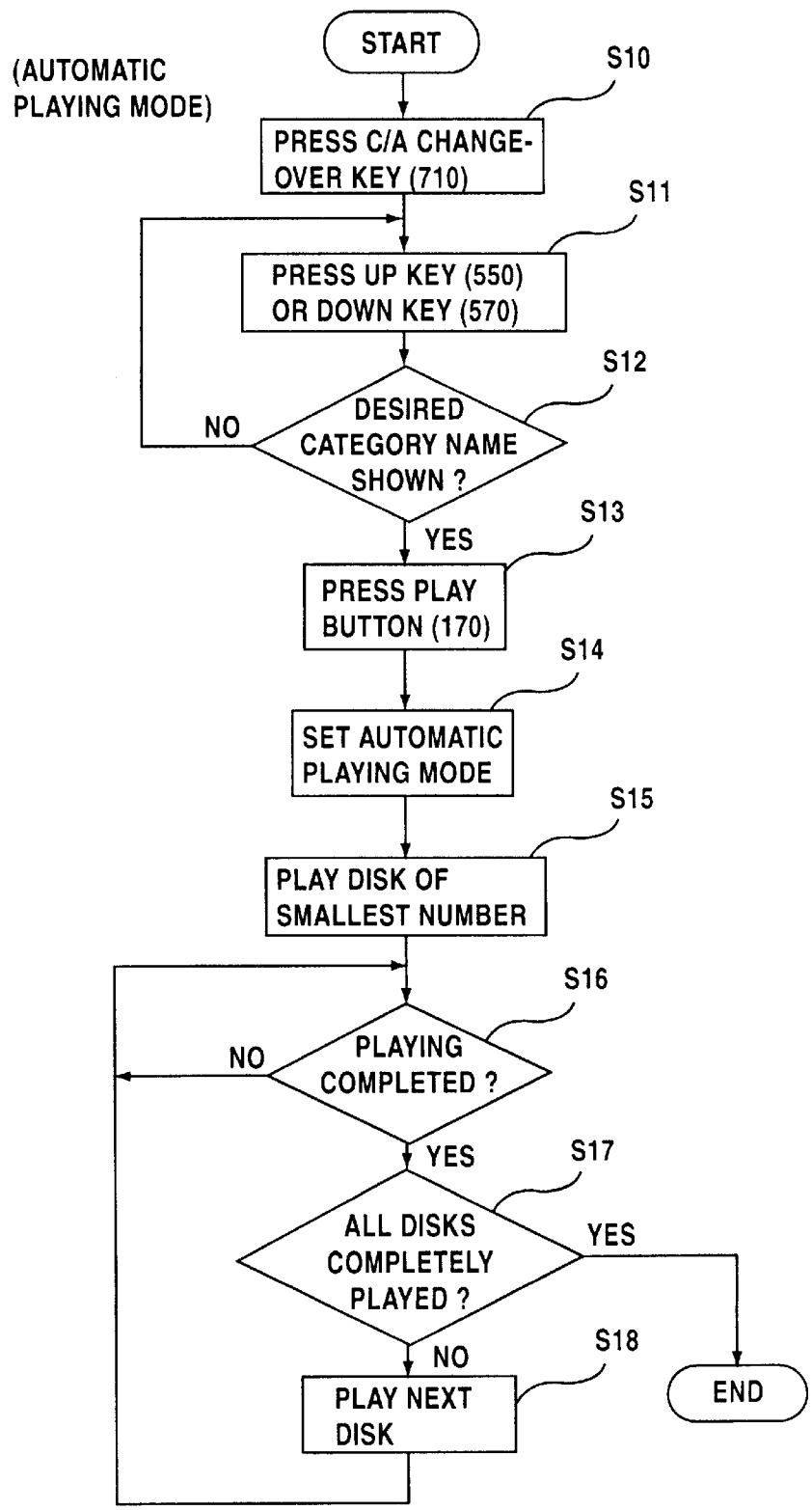
FIG. 10 is a flow chart showing an operation in an automatic playing mode.

[Automatic Playing Mode, see FIGS. 2 and 10]

A mode wherein the disks belonging to the same category and accommodated in the magazine 3 are played successively is referred,to as the automatic playing mode. The applicant has previously proposed a device having this automatic playing mode in JP-A-176176/1995.

The device main body is set in the automatic playing mode by the procedure shown in the flow chart of FIG. 10. First, the C/A change-over key 710 in the automatic operation key group 700 is pressed (S10). The row of characters "SELECT CATEGORY" is shown in the category/artist indicating box 370 on the display 330.

Next, the up key 740 or down key 730 of FIG. 2 is pressed (S11). The category name corresponding to the keyed-in input is retrieved from the nonvolatile memory 290 and shown in the indicating box 370. The segment 310 of the indicator 300 corresponding to the block 310 including disk spaces 31 given the category name is lighted up as previously stated. When the desired category name is shown in the category/artist indicating box 370 (S12), the user presses the play button 170 (S13), whereby the device main body 100 is set in the automatic playing mode (S14).

When the signal from the play button 170 is fed to the system control means 600 through the bus line 230, a command to play the disks in all the disk spaces 31 belonging to the category concerned is issued by the automatic playing means 620 to the changer mechanism 400 through the port 260. The magazine 3 is rotated, whereby the disk in the disk space 31 of the smallest identification number among the disk spaces 31 assigned the indicated category name is positioned as opposed to the playback portion 7, and the disk is played (S15). The disk is transferred from the magazine 3 to the recording-playback portion 7 in the manner already described.

The other disks are thereafter similarly played one after another (S18). When all the disks belonging to the selected category have been played, the automatic playing operation is terminated (S17).

[Automatic Loading-Unloading Mode]

The device according to the present embodiment is adapted to unload disks from the disk spaces 31 which are given the same category name or artist name. More specifically, when the disk spaces 31 assigned the same category or artist name include those each containing a disk, the device main body is set in the automatic unloading mode for taking out such disks. Conversely if none of the disk spaces 31 of the same category or artist name contain a disk, the device main body is set in the automatic loading mode in which disks belonging to the same category or artist name are automatically loadable.

A particular category name or artist name is stored for each of the disk spaces 31, so that when a category name is indicated in the category/artist indicating box 370 of the display 330, the segment 310 of the indicator 300 is lightened up which corresponds to the block including the disk spaces 31 corresponding to the category name even if no disk is present in the disk spaces 31.

Figure 11:
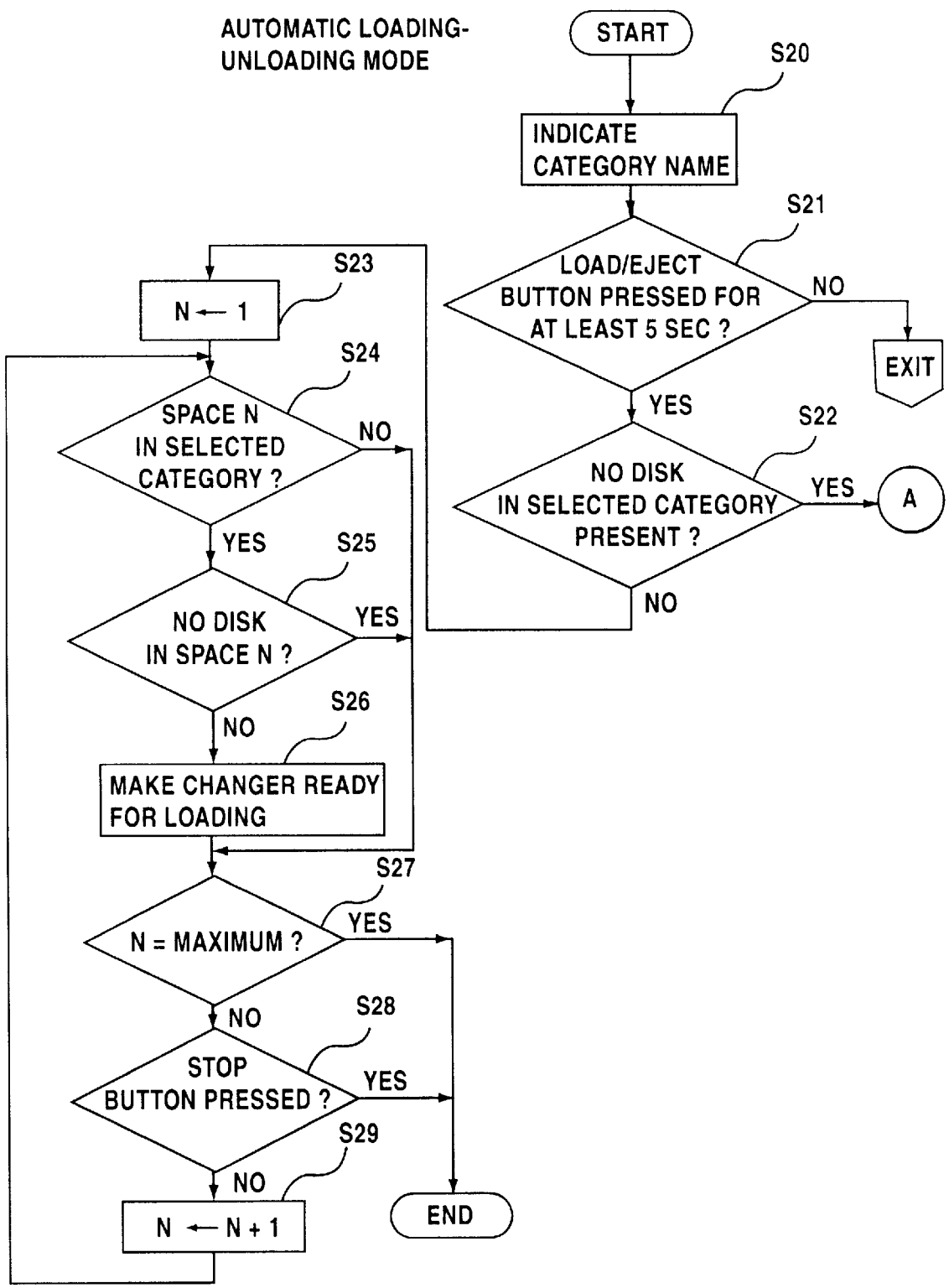
FIG. 11 is a flow chart showing an operation in the automatic loading mode.

The automatic loading mode or the automatic unloading mode is alternatively selected automatically depending on whether the disk is present in the disk spaces 31 assigned the same category name or artist name, as will be described below with reference to the flow charts of FIGS. 11 and 12.

First as in the automatic playing mode, the C/A change-over key 710, and the up key 740 or down key 730 of the automatic operation key group 700 are pressed to show the desired category name in the category/artist indicating box 370 (S20). As previously stated, each segment 310 of the indicator 300 on the display 330 is lighted up when the corresponding block 320 includes the disk spaces 31 assigned the category name concerned.

The load/eject button 130 is thereafter held pressed for at least 5 seconds (S21). The timer means 295 within the processor 200 checks whether the button is pressed for at least 5 seconds, and if the duration is less than 5 seconds, the automatic loading or unloading mode is not set. If the button has been pressed for at least 5 seconds, the system control means 600 is notified of this check result.

The automatic loading-unloading means 630 of the system control means 600 searches the nonvolatile memory 290 for all disk spaces 31 which are assigned the same category name as the selected category name, and checks the RAM 220 as to whether these disk spaces 31 contain a disk (S22).

[Automatic Loading Mode]

When no disk is present in any of the disk spaces 31 belonging to the same category, the automatic loading-unloading means 630 sets the automatic loading mode in which disks are loaded into the device main body 100 as previously stated. This procedure will be described below.

First, the identification number N of the disk space 31 to be checked is set at 1 (S23), and the space 31 of No. 1 is checked with reference to the data in the RAM 220 and the nonvolatile memory 290. If the disk space 31 of the identification number N is not in the selected category, the sequence proceeds to step S27, whereas when it is in the same category, the space 31 is checked for the presence of disk (S24, S25). When the space 31 contains no disk, the changer mechanism 400 is made ready to load a disk (S26). More specifically, the magazine 3 is rotated to position the vacant disk space 31 with the identification number N as opposed to the inlet-outlet portion 4, whereupon the magazine 3 is stopped. The first roller unit 6 is then rotated in the disk loading direction. When the sensors SE3 to SE8 detect passage of the disk, this indicates that the disk has been drawn into the magazine 3.

On completion of disk loading, an inquiry is made as to whether the identification number N is the maximum, i.e., 150 (S27). If the answer is affirmative, the device main body 100 is brought out of the automatic loading mode. If otherwise, an inquiry is made as to whether the stop button 160 has been pressed (S28). When the answer is yes, the device main body is brought out of the automatic loading mode. In the absence of any input from the stop button 160, 1 is added to the identification number N, followed by step S24 again (S29).

In this way, the search or checking operation is repeated with the identification number incremented by 1 every time to obviate failure that would occur in step S22. Although a certain disk space 31 falls under the selected category and contains a disk, it is likely that the disk space will be found vacant in error, followed by loading of another disk. The procedure described obviates such possibility.

[Automatic Unloading Mode]

Figure 12:
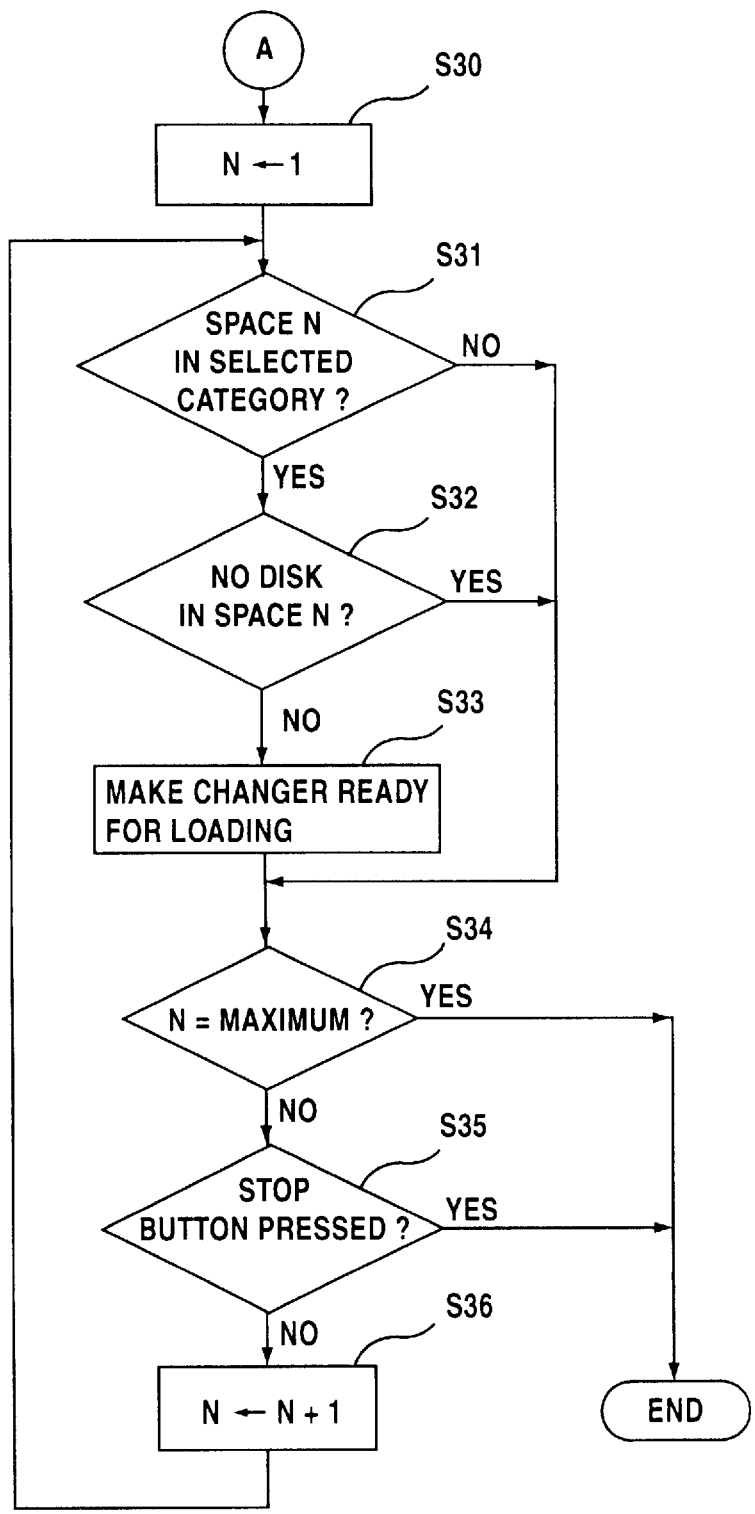
FIG. 12 is a flow chart showing an operation in an automatic unloading mode.

When one of the disk spaces 31 falling under the same category contains a disk, the automatic loading-unloading means 630 sets the device main body 100 in the automatic unloading mode wherein the disk is unloaded from the main body 100 (see FIG. 12).

First, the identification number N of the disk space 31 to be checked is set at 1 (S30) as in the automatic loading mode. If the disk space 31 of the identification number N is not in the selected category, the sequence proceeds to step S34, whereas when in the same category, the space 31 is checked for the presence of disk (S31, S32). When the space 31 contains a disk, the changer mechanism 400 is made ready to unload the disk (S33). More specifically, the magazine 3 is rotated to position the disk-containing space 31 as opposed to the inlet-outlet portion 4, whereupon the magazine 3 is stopped. The first roller unit 6 is then rotated in the disk unloading direction. When the disk has moved past the sensors SE3 to SE8, the sensors detect complete unloading of the disk.

Step S34 to step S36 thereafter follow until the identification number N reaches the maximum as in the automatic loading mode.

The disk recording-playback device of the type described is adapted to accommodate a multiplicity of disks and can therefore be utilized also as a disk stowing case chiefly for indoor use. However, with automobile stereo systems and portable players placed into wide wise, disks are often used outdoors, and there is a case wherein disks belonging to a specified group are taken out from the magazine 3 for outdoor use.

The device according to the present embodiment is adapted to successively unload disks from the disk spaces 31 falling under a particular category and is therefore conveniently usable for withdrawing disks from the magazine 3.

With the device of the present embodiment, the names of categories and the names of artists are independently stored in the RAM 220 and the nonvolatile memory 290. With the automatic playing device previously proposed by the inventors as disclosed in JP-A-176176/1995, the names of artists are termed subcategories and attendant on the names of categories, such that music is automatically played chiefly based on the category names. In the case of the present device, however, automatic playing and automatic unloading can be effected based on the names of categories or artists or titles as desired by the user.

What is claimed is:

1. A disk player devices, comprising:

a magazine rotatably mounted on a chassis and having a plurality of disk spaces for accommodating disks in an upright position;

an inlet-outlet portion provided externally of the magazine for permitting the disk to pass therethrough between an outside of a device main body and the magazine;

first memory means for storing information as to a presence or absence of the disk in each of the disk spaces; and second memory means for storing for each of the disk spaces the name of a group to which belongs the disk to be accommodated in the disk space, wherein the device main body has automatic loading-unloading means for searching the second memory means for the disk space assigned the same group name as a specified group name and searching the first memory means for the information as to the presence or absence of the disk within the disk space assigned the group name, and wherein the automatic loading-unloading means has the function of setting the device main body in an automatic loading mode when no disk is present in any of all disk spaces assigned the same group name as the specified group name to repeat the operation of rotating the magazine to position the empty disk space as opposed to the inlet-outlet portion and drawing a disk into the magazine, or alternatively setting the device main body in an automatic unloading mode when at least one disk is contained in the disk spaces assigned the same group name as the specified group name to repeat the operation of rotating the magazine to position the disk-containing space as opposed to the inlet-outlet portion and unloading the disk from the magazine.

2. A disk player device as recited in claim 1, wherein the said same group name is the name of a category indicating the field of music recorded on the disk, the name of the artist playing the music recorded on the disk or a title given by the user to the disk.

3. A disk loading or unloading method for a device main body including a magazine having a plurality of disk spaces for accommodating disks in an upright position, an inlet-outlet portion positioned between outside of the device main body and the magazine for permitting the disk to pass therethrough, first memory means for storing information as to a presence or absence of the disk in each of the disk spaces, and second memory means for storing for each of the disk spaces the name of a group to which belongs the disk to be accommodated in the disk space, the method comprising the steps of:

searching the second memory means for the disk space assigned the same group name as a specified group name and searching the first memory means for the information as to presence or absence of the disk within the disk space assigned the group name; and repeating the operation of rotating the magazine to position an empty disk space as opposed to the inlet-outlet portion and drawing a disk into the magazine when no disk is present in any of all disk spaces assigned the same group name as the specified group name.

4. A disk loading or unloading method for a device main body including a magazine having a plurality of disk spaces for accommodating disks in an upright position, an inlet-outlet portion positioned between outside of the device main body and the magazine for permitting the disk to pass therethrough, first memory means for storing information as to a presence or absence of the disk in each of the disk spaces, and second memory means for storing for each of the disk spaces the name of a group to which belongs the disk to be accommodated in the disk space, the method comprising the steps of:

searching the second memory means for the disk space assigned the same group name as a specified group name and searching the first memory means for the information as to presence or absence of the disk within the disk space assigned the group name; and repeating the operation of rotating the magazine to position a disk-containing space as opposed to the inlet-outlet portion and unloading the disk from the magazine when at least one disk is contained in the disk space assigned the same group name as the specified group name.

* * * * *

UNITED STATES PATENT AND TRADEMARK OFFICE
CERTIFICATE OF CORRECTION

PATENT NO.: 5,892,738
DATED     : April 6, 1999
INVENTOR(S): Keiji HIRAO et al.

It is certified that error appears in the above-identified patent and that said Letters Patent is hereby corrected as shown below:

On the title page:

Item [22], change "June 23, 1997" to --June 24, 1997 --.

Signed and Sealed this

Twelfth Day of October, 1999

Attest:

Q. TODD DICKINSON

Attesting Officer

Acting Commissioner of Patents and Trademarks